United States Patent
Pedemonte et al.

(10) Patent No.: US 12,459,109 B2
(45) Date of Patent: Nov. 4, 2025

(54) CABLE-DRIVEN PARALLEL ROBOT WITH DOUBLE CABLES, AND INSTALLATION COMPRISING SUCH A CABLE-DRIVEN PARALLEL ROBOT

(71) Applicant: INSTITUT DE RECHERCHE TECHNOLOGIQUE JULES VERNE, Bouguenais (FR)

(72) Inventors: Nicolo Pedemonte, Cugand (FR); Adolfo Suarez Roos, Paris (FR); Stéphane Caro, Nantes (FR); Viktor Vavra, Saint-Herblain (FR)

(73) Assignee: INSTITUT DE RECHERCHE TECHNOLOGIQUE JULES VERNE, Bouguenais (FR)

( * ) Notice: Subject to any disclaimer, the term of this patent is extended or adjusted under 35 U.S.C. 154(b) by 23 days.

(21) Appl. No.: 18/576,923

(22) PCT Filed: Jul. 6, 2022

(86) PCT No.: PCT/EP2022/068789
§ 371 (c)(1),
(2) Date: Jan. 5, 2024

(87) PCT Pub. No.: WO2023/280941
PCT Pub. Date: Jan. 12, 2023

(65) Prior Publication Data
US 2024/0293928 A1    Sep. 5, 2024

(30) Foreign Application Priority Data
Jul. 6, 2021 (FR) ........................ 2107309

(51) Int. Cl.
*B25J 9/00* (2006.01)
(52) U.S. Cl.
CPC .................. *B25J 9/0078* (2013.01)

(58) Field of Classification Search
CPC ........................................ B25J 9/0078
See application file for complete search history.

(56) References Cited

U.S. PATENT DOCUMENTS

| 9,964,836 B2 | 5/2018 | Bennett et al. |
| 10,369,693 B1* | 8/2019 | Levine ................ A01C 7/085 |

(Continued)

FOREIGN PATENT DOCUMENTS

| KR | 20190014287 A | 2/2019 |
| WO | 2020/198862 A1 | 10/2020 |

OTHER PUBLICATIONS

International Search Report and Written Opinion mailed Sep. 13, 2022, in connection with International Patent Application No. PCT/EP2022/068789, 13 pgs. (including translation).

(Continued)

*Primary Examiner* — Joseph Brown
(74) *Attorney, Agent, or Firm* — Chiesa Shahinian & Giantomasi PC (57) ABSTRACT

A cable-driven parallel robot that includes a movable platform intended to be suspended by cables, each of the cables having one cable strand configured to be tensioned between a first strand end connected to the movable platform and a second strand end connected to a structure fixed in space; and winding assemblies, each winding assembly being connected to a pair of associated cables from among the cables and being configured to synchronously wind the pair of associated cables; the cable-driven parallel robot being characterized in that when the platform occupies a reference orientation relative to the vertical, the first strand ends of the cables in a single pair of cables are vertically and horizontally offset from one another.

15 Claims, 8 Drawing Sheets

(56) References Cited

U.S. PATENT DOCUMENTS

| | | | |
|---|---|---|---|
| 10,427,919 B2* | 10/2019 | Rodríguez Mijangos | .................... B66C 13/08 |
| 2003/0168647 A1* | 9/2003 | Thompson | .............. B66C 21/00 254/270 |
| 2009/0066100 A1* | 3/2009 | Bosscher | ............. B25J 17/0266 901/30 |
| 2012/0211628 A1 | 8/2012 | Fisher et al. | |
| 2020/0001552 A1* | 1/2020 | Kneveler | ................ B25J 9/0078 |
| 2021/0069897 A1* | 3/2021 | Vachon | .................. B25J 9/0018 |
| 2024/0139767 A1* | 5/2024 | Zi | ........................ B25J 11/0075 |

OTHER PUBLICATIONS

Nguyen Dinh Quan et al., "On the analysis of large-dimension reconfigurable suspended cable-driven parallel robots" 2014 IEEE Internatoinal Conference on Robotics and Automation (ICRA), May 31, 2014 (May 31, 2014), pp. 5728-5735 DOI: 10.1 109/ICRA. 2014.690770, XP032650367.

* cited by examiner

CABLE-DRIVEN PARALLEL ROBOT WITH DOUBLE CABLES, AND INSTALLATION COMPRISING SUCH A CABLE-DRIVEN PARALLEL ROBOT

This application is a 35 U.S.C. 371 of International Patent Application No. PCT/EP2022/068789, filed Jul. 6, 2022, which claims the benefit of priority to French Patent Application No. 2107309, filed Jul. 6, 2021; the disclosures of all of which are incorporated herein by reference in their entireties.

TECHNICAL FIELD OF THE INVENTION

The invention relates, in general, to the technical field of cable-driven parallel robots.

The invention relates more specifically to a movable platform for a cable-driven parallel robot and a movable cable-driven parallel robot comprising such a movable platform.

PRIOR ART

A "cable-driven parallel robot" or "cable robot" is a parallel-kinematics robot, wherein a platform is positioned and moved in a space determined by means of cables acting on said platform. Each cable extends between an anchoring point on this platform and for example a winch attached to a fixed structure, the winch constituting an anchoring. The large capacity for varying the length of cable between the anchoring point of the platform and the anchoring to the fixed structure makes it possible to obtain a working volume of the movable platform that is particularly large with a lightweight structure, and easily put in place by installing the anchors, for example on the ceiling of a workshop or on beams at height.

Cable-driven parallel robotics make it possible to work in large volumes. It is particularly interesting for example in the field of inspection of large products, for example in aeronautics, naval, transportation means in general, construction, wind turbines, etc.

The stability of such a platform in a given position is generally ensured by its static equilibrium, which equilibrium is ensured by the tension of the cables that act so as to oppose the external forces to which the platform is subjected. Thus, to ensure the stability of any position and orientation of the platform in space, it is known that a minimum of seven or eight cables is necessary to move the movable platform along six degrees of freedom. The cable-driven parallel robot operates with several kinematic chains or closed loops.

In general, the number of cables supporting the platform is equal to eight: this makes it possible to impart six degrees of freedom to the robot, and thus to have satisfactory precision when controlling the robot in its task. Indeed, when the cable-driven parallel robot comprises eight independent cables, this makes it possible to control the three degrees of freedom in translation and the three degrees of freedom in rotation of the movable platform in a large space. It is also known to use a number of cables that can be less than eight, being for example equal to seven. It should be noted that for reasons of symmetry of the architecture of the robot, the presence of eight cables is preferred. Moreover, this makes it possible to have a larger working space, although the risk of collisions between cables increases with the number of cables. However, in some cases it is sometimes desired to use a number of cables greater than eight.

When the number of cables is greater than eight, it is possible to have redundancy among the cables which makes it possible to increase the possibility of rotation of the platform.

However, the search for the speed of execution of cable-driven parallel robots and stability leads to structures of movable platforms that are generally complex and bulky, in particular affecting the mass of the movable platform to be moved.

In the field of automatic inspection of a part or a large product, for example one that is several tens of meters in length, there is a need for solutions that are simple, easy to deploy, inexpensive, stable, and secure, all at once. Drones make it possible to cover such volumes, but they cannot guarantee the same repeatability as a cable-driven parallel robot, and the risks of falling limit their deployment. Drones therefore pose problems of safety, in particular, but also of image stability, energy consumption, noise, and repeatability. Large-sized Cartesian gates/structures are also used for the inspection of large parts. However, the gates are expensive and difficult to move. Moreover, they allow the inspection of parts with a more limited volume compared to those allowed by a cable-driven parallel robot.

It is understood that currently there is no system capable of ensuring such inspection at the cost and with the repeatability that can be achieved by the cable-driven parallel robot.

Regarding the safety of a cable-driven parallel robot, some solutions have been proposed to prevent the platform from falling. For example, the use of a central cable as described in document U.S. Pat. No. 9,964,836 is known. Such an approach makes it possible to prevent the platform from falling on the ground when a cable gives way, and is therefore sufficient when the need is limited to protecting people working below the system. However, in the case of inspection, the platform carried by the cables can move considerably closer to the part to be controlled and, if a cable were to break, the safety system based on a central cable would not in any way prevent the oscillations of the platform which could therefore collide with the part.

DISCLOSURE OF THE INVENTION

The invention aims to remedy all or some of the disadvantages of the prior art by proposing in particular a solution making it possible to obtain a cable-driven parallel robot, which is easy to deploy and has improved stability to perform inspections in complete safety, in particular with respect to undesired oscillations during an inspection phase in the operational mode.

To do this, proposed according to a first aspect of the invention is a cable-driven parallel robot, comprising:
  a movable platform intended to be suspended by cables, each of the cables having a cable strand configured to be tensioned between a first strand end connected to the movable platform, and a second strand end connected to a structure fixed in space;
  winding assemblies, each winding assembly being connected to a pair of associated cables among the cables and configured to synchronously wind the associated pair of cables;
  the cable-driven parallel robot being characterized in that when the movable platform is in a reference orientation relative to the vertical, the first ends of the cable strands of a same pair of cables are offset vertically from each other and are offset horizontally from each other.

Due to the fact that each winding assembly is connected to a pair of associated cables among the cables and configured to wind the pair of associated cables synchronously, this results in a configuration wherein each cable is doubled to form a pair of cables. In such a configuration, the cables of the same pair are wound, or unwound depending on the operating sequence, synchronously by a single winding assembly. Such a configuration provides maximum stability of the platform when a cable breaks. Moreover, the vertical and horizontal offsets of the ends of the cables on the platform make it possible to limit the parasitic rotations, the moments exerted on the platform but also the oscillations of the platform.

According to one embodiment, each winding assembly is connected to only one pair of associated cables among the cables and configured to synchronously wind the pair of associated cables. In such a configuration, each winding assembly is connected to the platform by only two cables. Such a configuration is sufficient to guarantee the stability of the platform while offering an architecture that is simple to implement and to control.

According to one embodiment, the first end of each cable strand is attached to the platform at an anchoring point. In this way, the first end of the strand is anchored to the platform. Such a configuration makes it possible to obtain a structure that is both simple and stable and that makes it possible to avoid making the platform heavier. Alternatively, the first end of each cable strand can be configured to be tensioned on a return member between the associated cable strand and an anchor point located on the platform. In this case, the cable arrives on the platform at a return member, for example a return pulley, and is secured at a further anchoring point.

According to one embodiment, the second end of each cable strand is configured to be tensioned on a return member between the associated cable strand and the associated winding assembly. This configuration makes it possible to move the anchoring or fastening of the cable to a more practical area, in particular near the floor so as to improve the installation of the platform when it is removable or to facilitate the installation of the cable-driven parallel robot and the manipulations by the operators. Alternatively, the second end of each cable strand is attached to the fixed structure at an anchoring point.

According to one embodiment, the vertical offset and the horizontal offset of the first ends of the cable strands of a given pair of cables are equal.

According to one embodiment, the platform has a suspension frame having a shape forming a straight prism with a polygonal base, the base being arranged horizontally in a reference orientation relative to the vertical.

According to one embodiment, the platform has a suspension frame having a shape that is parallelepiped, preferably rectangular parallelepiped, even more preferably cubic.

According to one embodiment, the first ends of the cable strands of a given pair of cables are arranged on the platform substantially at the ends of a diagonal of a lateral face of the suspension frame. Such a configuration further improves the stability of the platform. In such a configuration, the prismatic shape delimits lateral faces of the platform. Preferably, the cable-driven parallel robot comprises as many pairs of cables as the lateral faces of the platform. A rectangular or cubic parallelepiped shape corresponding to particular configurations of square-based straight prisms. When the first ends of the strands of cables of each given pair of cables are arranged on the platform substantially at the ends of a diagonal of an associated lateral face of the suspension frame, a configuration is obtained wherein each lateral face of the prismatic shape is suspended from a pair of given cables guaranteeing a maximum stability thereof, all the more so for a cubic shape wherein the first two ends of the strands of cables of each given pair of cables are located in a vertical plane and located on a straight line oriented at 45 degrees relative to a horizontal plane in the reference orientation relative to the vertical.

According to one embodiment, each winding assembly comprises two drums rotatable around a common rotation shaft, each of the drums being rigidly connected to one of the cables among the cables of a pair of associated cables, the two drums preferably being remote from each other by an average distance substantially equal to the distance separating the first ends of the cable strands of the associated pair of cables. In this way, a substantially constant cable spacing between the cables of the same pair is obtained to limit the oscillations.

According to one embodiment, the number of pairs of cables is greater than or equal to 3, preferably greater than or equal to 4 and/or less than or equal to 10, preferably less than or equal to 8, more preferably less than or equal to 6. In particular, four pairs of cables represent a good compromise between the desired stability and the simplicity of the structure.

Another aspect of the invention relates to an installation comprising a cable-driven parallel robot as described above, and a fixed structure to which the platform is suspended.

According to one embodiment, the fixed structure comprises a plurality of suspension structures, each of the suspension structures being configured to comprise a connection with each of the second ends of the cable strands of a given pair of cables, each of the connections preferably comprising a cable return member for each of the cables of the given pair of cables, the second end of each cable strand of the given pair of cables being configured to be tensioned on the associated return member, between the associated cable strand and the associated winding assembly. In this configuration, each suspension structure forms a localized suspension zone for a given pair of cables. In other words, the two strands of cables of a given pair of cables are associated with a single suspension structure, different from the others and forming a dedicated suspension zone. Each of the suspension structures preferably comprises only two connections, the suspension structure interconnecting the two connections.

According to one embodiment, the distance between the connections of the second ends of the cable strands of a given pair of cables are separated from each other by a distance equal to the distance separating the first ends of the cable strands of the associated pair of cables.

According to one embodiment, in a suspended position of the movable platform, the cable strands of a given pair of cables are parallel. Preferably, each of the first and second ends of the cable strands of the same pair of cables are arranged so as to form an associated parallelogram. In such a configuration, the first and second ends of the strands of cables of the same pair of cables each form one of the angles of the associated parallelogram and two of the parallel sides being carried by the associated strands of cables. Only the variation in length of said cable strands varying concomitantly for the two cable strands of the same pair makes it possible to control the movement of the platform. Such an arrangement of the pairs of cables in a parallelogram makes it possible to further improve the stability of the platform during the inspection phases. The parallelograms thus make it possible to constrain the rotations of the movable platform.

According to one embodiment, in a suspended position of the movable platform, each cable of the cable-driven parallel robot comprises a secondary cable strand configured to be tensioned between the second end of the associated cable strand and a third end of the secondary strand connected to the structure fixed in space, the secondary cable strands of a given pair of cables preferably being substantially parallel.

According to one embodiment, in a suspended position of the movable platform, the second ends of the cable strands of the given pair of cables are offset vertically from each other and are offset horizontally from each other, the vertical offset and the horizontal offset of the second ends of the cable strands of a given pair of cables being preferably equal. When the vertical offset and the horizontal offset of the second ends of the cable strands of a given pair of cables are equal, a configuration is obtained wherein the two ends are located in the same vertical plane and located on a straight line oriented at 45 degrees relative to a horizontal plane.

According to one embodiment, for cable strands of a given pair of cables, the vertical offset of the first ends is equal to the vertical offset of the second ends and the horizontal offset of the first ends is equal to the horizontal offset of the second ends. In this way, the arrangement on the movable platform of the first ends of the cable strands of a given pair of cables adheres to the arrangement of the second ends of the strands of cables of the same pair of given cables, in practice of pulleys. It will be noted that in the particular configuration where the vertical and horizontal offsets of the first and second ends of the cable strands of a given pair of cables are all equal in absolute value, a configuration is obtained wherein the parallelogram associated with the given pair of cables is located in a plane oriented at 45 degrees relative to a horizontal plane. Preferably, each of the pairs of cables has such a configuration wherein the vertical and horizontal offsets of the first and second ends of the cable strands of one of the given pairs of cables are equal, and therefore all of the parallelograms associated with the pairs of data cables are each located in an associated working plane oriented at 45 degrees relative to a horizontal plane.

According to one embodiment, at least one of the second ends of the cable strands of a given pair of cables is connected to the fixed structure by at least one damping mechanism, preferably each of the second ends of the cable strands of the given pair of cables is connected to the fixed structure by at least one damping mechanism.

According to one embodiment, the winding assemblies are each located in the vicinity of the floor on which the fixed structure rests. In this way, the maintenance of the winding assemblies is facilitated. The weight of the winding assemblies also participates in improving the stability of the fixed structure.

According to one embodiment, each winding assembly is moved by at least one motor, preferably a single motor, for motorizing a rotating shaft bearing at least one of the two drums, preferably both drums, of the same given pair of cables. The rotation of the shaft carrying the drums in one direction or the other allows the winding or the unwinding of the cables. The motor is preferably associated with a reducer, to form a geared motor. In other words, each of the motors or geared motor rotates two associated drums. Of course, even if the winding assembly is moved by a single motor, it is possible to provide a second motor or backup geared motor, for example located at an opposite end of the main drive motor or geared motor relative to the rotating shaft, and which is only actuated in the event of failure of the main drive motor. By virtue of such a configuration, with one motor per pair of cables, it is possible to halve the number of motors relative to the number of given cables, grouped here in pairs. With a parallel robot configured by four pairs of cables, the four motors are used to control the movements of the translational movement of the movable platform.

According to one embodiment, the fixed structure comprises removable masts configured to be upright in the deployed position, and each supporting at least one of the suspension structures.

According to one embodiment, the parallel robot comprises at least one control assembly for controlling the winding assemblies of the movable platform and controlling the movement of the movable platform in an operational mode, the parallel robot further comprises means for detecting a break of at least one of the cables, connected to the control means, the control means being configured to control the winding assemblies in a degraded mode different from the operational mode when the detection means detect that at least one of the cables has broken. By virtue of such a combination of features, it is possible to reduce the risk of collision in the event of a cable breaking, and therefore to improve the safety of the inspected part. Indeed, by virtue of the means for detecting breakage on the one hand, and the control means on the other hand, making it possible to control the winding assemblies in a degraded mode different from the operational mode when the detection means detect that at least one of the cables has broken, the platform is thus prevented from moving in an uncontrolled manner when a cable breaks.

According to one embodiment, the cables are electrically conductive, the cables each comprising at least one conductive component, in particular a metal component, which extends in a longitudinal direction of the cable, for example a metal coating and/or at least one metal wire in a structure of the cable, the detection means being electrically connected to the conductive component.

Alternatively or additionally, other means for detecting the breakage of the cable can also be considered: by mechanical means, for example by the detection of the pair of winding assemblies, by imaging such as by means of one or more cameras, optical solutions provided for example with at least one reflecting target, for example a mirror, carried by the cable with a laser source at a pulley or at an anchoring at one end of the associated cable strand, etc.

According to one embodiment, the means for detecting a cable break comprise at least one electrical circuit intended to circulate a current, for example a direct current, an alternating current, or a current pulse, in the metal component of each cable. Such a solution is particularly advantageous and simple to implement in the case where the cables each comprise at least one conductive component.

According to one embodiment, the conductive component of each of the cables has a first end connected to the detection means and a second end connected to the detection means, and forms a conductive loop between the first end and the second end, the conductive loop extending in the longitudinal direction of the cable.

According to one embodiment, the control means are operational to, in degraded mode, control the winding assemblies as a function of:
- a known position datum of the part;
- a position datum of the movable platform before the break;
- a datum identifying the broken cable among the cables.

According to one embodiment, the cables of a pair of associated cables are overall interconnected transversely to their direction when they are tensioned, by return cables, preferably located in an area near the first ends of the strands of the cables of the associated pair of cables. In addition to limiting oscillations in the event of cable breakage, such a solution with return cables joining two cables of the same pair retains the portion of the severed cable strand attached to the platform and prevents it from falling back onto the inspected part under its own weight.

In one embodiment, the cables comprise an elastic core so as to hold together two conjoined ends of an at least partially broken cable portion. An alternative or complementary solution also limits the risks when breaking the cables by providing them with an elastic core, such an elastic core having no particular tensile strength properties, but are configured to maintain the two joint ends of broken cable together but relaxed, after breaking.

According to another aspect of the invention, it relates to a method for securing a cable-driven parallel robot as described above, the method comprising at least the following steps:
- a step of detecting the breakage of at least one cable by the means for detecting the breakage of a cable;
- a step of switching the control assembly from an operational mode to a degraded mode when the detection means detect the break in a cable.

According to one embodiment, the degraded mode comprises moving the platform along a separation or avoidance trajectory relative to a part to be inspected.

According to one embodiment, the degraded operating mode comprises:
- a step of calculating a first movement of the platform along a first trajectory configured to move the platform away from the inspected part;
- a step of calculating a second movement of the platform along a second trajectory designed to return the platform to a previous position detected by detection means, before breaking.

According to one embodiment, the step of moving the platform preferably comprises a step of applying to the platform a movement along an average separation or avoidance trajectory corresponding to the weighted sum of the first and second trajectories.

According to one embodiment, the securing method comprises:
- a step of calculating a distance, configured to calculate a distance between the platform and an inspected part;
- a step of calculating a movement of the platform along a trajectory oriented in an opposite direction so as to increase the distance separating the platform from the inspected part relative to the distance, for example for the calculation of the first movement of the platform along the first trajectory;

According to one embodiment, the step of moving the platform preferably comprises a step of applying the calculated movement to the platform.

According to one embodiment, the securing method comprises:
- a step of estimating an inclined position of the platform after the breaking;
- a step of calculating a distance, configured to calculate a distance between the platform and an inspected part in the estimated inclined position; and
- a step of calculating a movement of the platform along a trajectory oriented in an opposite direction so as to increase the distance separating the platform from the inspected part relative to the distance, for example for the calculation of the first movement of the platform along the first trajectory;

According to one embodiment, the step of moving the platform preferably comprises a step of applying the calculated movement to the platform.

BRIEF DESCRIPTION OF THE FIGURES

Other features and advantages of the invention will become apparent on reading the following description, with reference to the appended figures, which show.

For greater clarity, identical or similar elements are identified by identical reference signs in all of the Figures.

In the description and the claims, to clarify the description and the claims, the terminology longitudinal, transverse and vertical will be adopted in reference to the trihedron X, Y, Z indicated in the figures.

DETAILED DESCRIPTION OF ONE EMBODIMENT

With reference to FIGS. 1 to 10, a system 100 comprising a cable-driven parallel robot 1 with a movable platform 10 suspended by suspension cables 20 from a fixed structure 30 is shown.

The platform 10 is configured to carry at least one inspection tool (not shown), such as an inspection sensor, preferably connected to the movable platform 10 by a swivel mechanism. In this way, the inspection tool can be directed towards a desired area of the part being inspected, depending on the position of the movable platform 10. This configuration enables the platform 10 to be used for inspecting large parts or products such as aircraft, wind turbine blades, or ship hulls. Thanks to such non-destructive testing operations, it is possible to characterize the state of integrity of inspected structures or materials, without damaging them, either during production or use, or as part of maintenance procedures. The cable-driven parallel robot 1 used here is particularly well-suited to such inspection operations and to determining the material health of large structures.

Figure 4:
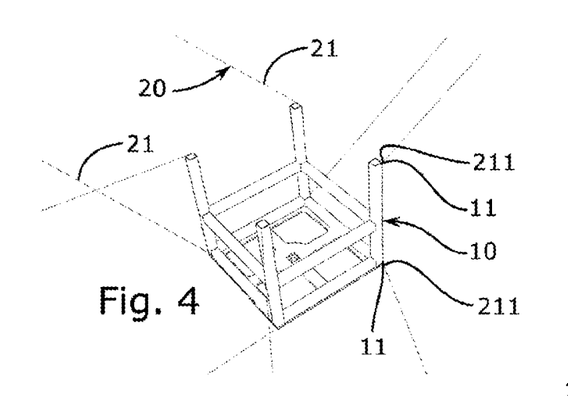
FIG. 4: an isometric view of the platform according to this embodiment.

The platform 10 features a suspension frame 12 with an overall cubic shape. Such an frame 12 is made up of a plurality of cross-members, each of which is preferably tubular to ensure that the frame 12 has both good rigidity and a light weight, and is able to carry inspection tools. The extent of the platform 10 corresponds broadly to the shape of a virtual outer platform envelope corresponding to its overall dimensions. In this embodiment, the number of cross-members is relatively small, the platform 10 comprising four horizontal cross-members delimiting a bottom of the platform 10, square in this embodiment, four other horizontal cross-members which are superimposed vertically on the bottom cross-members in a parallel manner to delimit a framework, also square, and four vertical cross-members, each of which is placed at the junction of two cross-members of each horizontal level, i.e. the bottom and the framework. Of course, the shapes of frame 12 can change, but such a configuration offers a good compromise between stability, structural strength, and lightness. Platform 10 forms a gondola to house the necessary inspection equipment.

Figure 1:
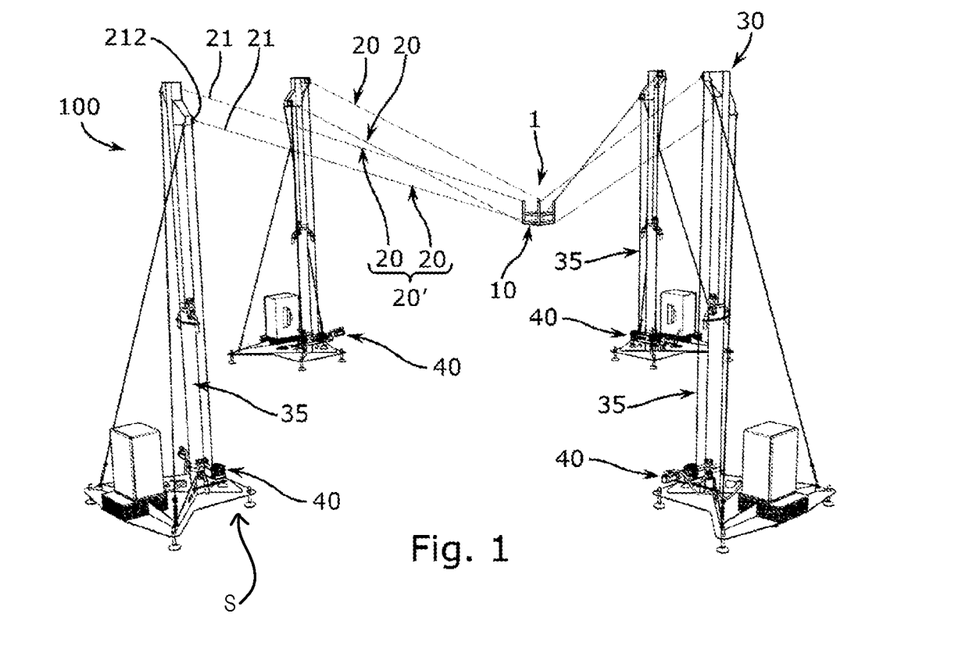
FIG. 1: a view of an installation comprising a cable-driven parallel robot according to one embodiment of the invention.
Figure 2:
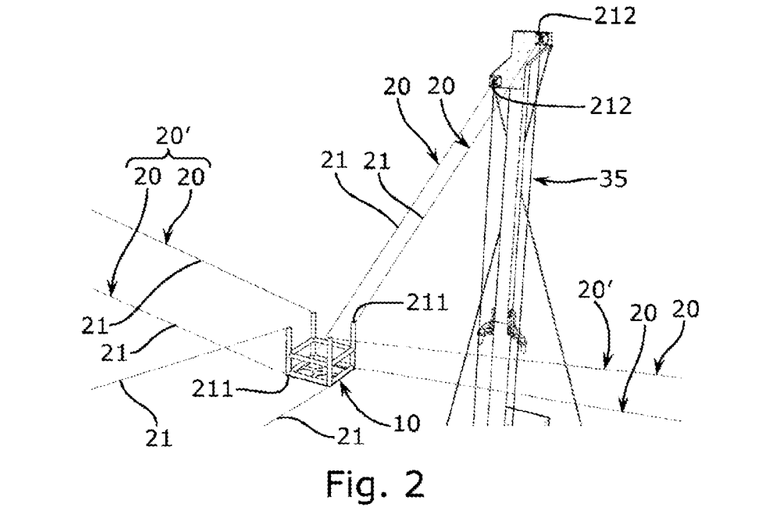
FIG. 2: a detail of FIG. 1.
Figure 3:
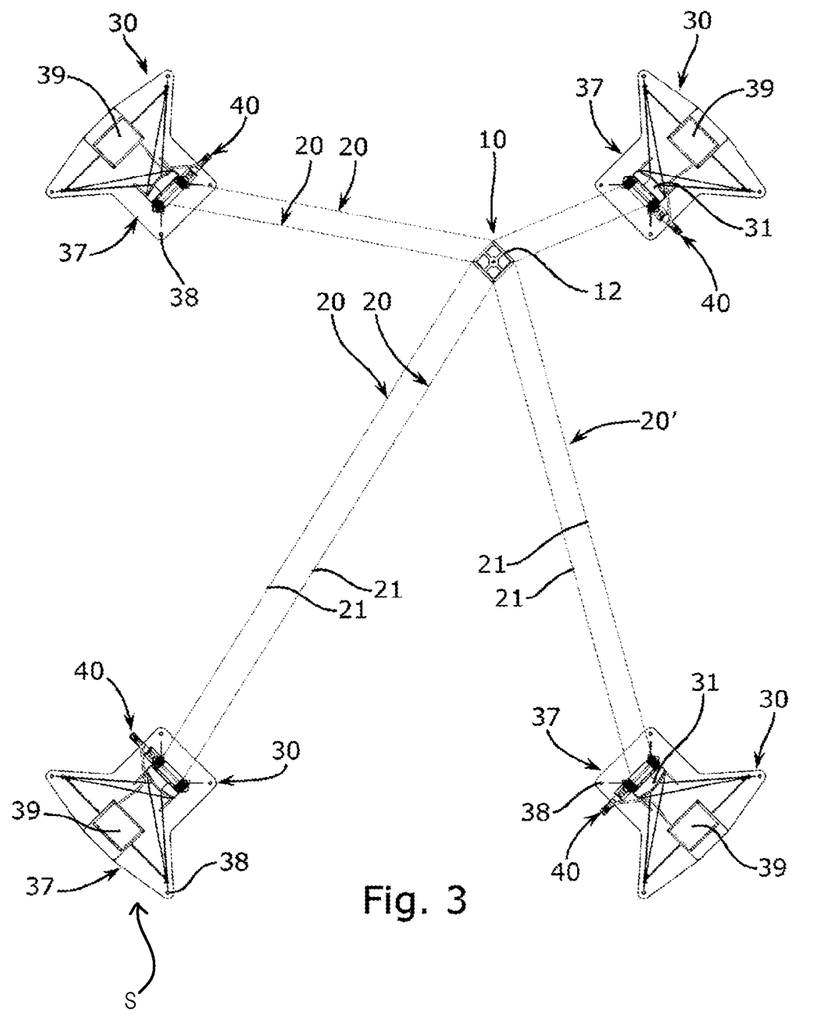
FIG. 3: a top view of the installation of FIG. 1.

The fixed structure 30 here is made up of a plurality of generally vertical upright masts 35 spaced at regular intervals around a working space within which the platform 10 can move. The installation 100 comprises four masts 35, each of which can be dismantled. The legs of the masts 35 are each connected to a base 37 weighted with an associated mass 39 sufficient to guarantee the stability and positioning of the mast 35 on the ground S on which it rests.

Figure 8:
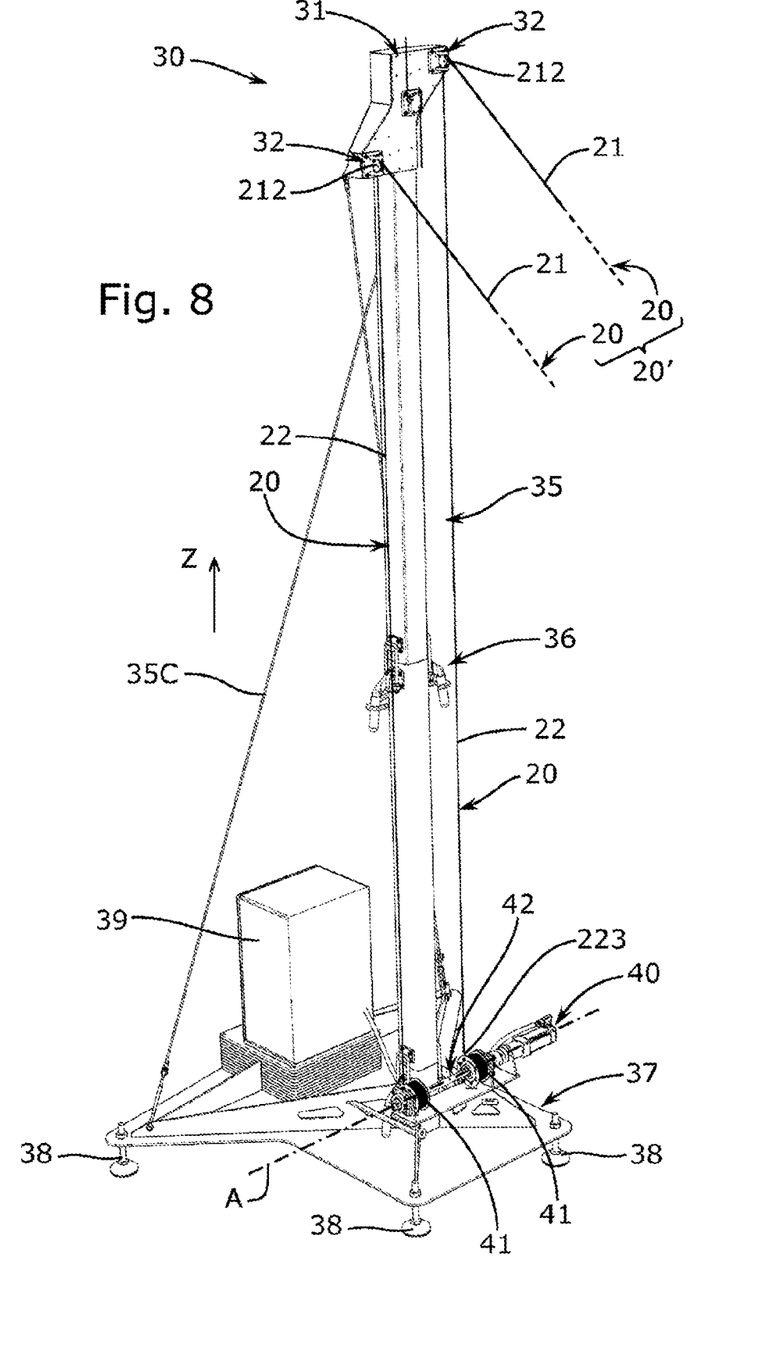
FIG. 8: an isometric view of a removable mast of the installation according to this embodiment.

In particular, each of the masts 35 has a lower portion 35A and an upper portion 35B, vertically aligned and assembled together by assembly means 36. The assembly means 36 are removable to allow the mast 35 to be dismantled, and to allow a lower end of the upper portion 35B to be attached to an upper end of the lower portion 35A. The mast 35, in particular the lower and upper portions 35A, 35B, has a parallelepipedal cross-section, in particular a square cross-section, the assembly means 36 being positioned on at least two opposite vertical faces of the mast 35. The assembly means 36 comprise a lever closure arranged on one 35A of the two parts to be connected, configured to engage with an opposing hook attached to the other 35B of the two parts to be connected. Closing the lever in engagement with the hook enables the two parts to be clamped together with a minimum of effort.

Each base 37 rests on four height-adjustable feet 38, so that the height of each foot 38, and therefore the horizontality of the base 37, can be adjusted even if the ground is uneven, that is to say not perfectly horizontal. This adjustment also ensures perfect verticality of the mast 35. The mast 35 is connected here to its base 37 in the same way as the connection between the lower and upper portions 35A, 35B. This connection is also removable. Each of the bases 37 has a vertically-aligned base 37A and is connected to a lower end of the lower portion 35A by similar connecting means 36, also comprising lever locks straddling the connection and facing each other.

Despite the ballast 39 resting on the base 37, the rigidity of the mast is guaranteed by reinforcement cables 35C running between an upper end of the mast 35, in particular an upper end of the upper portion 35B of the mast 35, and the base 37. The masts 35 are positioned around the working space within which the platform 10 is moved, each mast 35 separating a front part of the mast 35, oriented frontally with respect to this working space, and a rear part of the mast 35, opposite the front part and located behind the mast 35. The ballast 39 is located at the rear of each mast 35, and the anchoring points of the reinforcement cables 35C to the associated base 37 are also located at the rear of the associated mast 35. This configuration allows better absorption of the forces applied by the movable platform 10 suspended on the associated mast 35.

Figure 7:
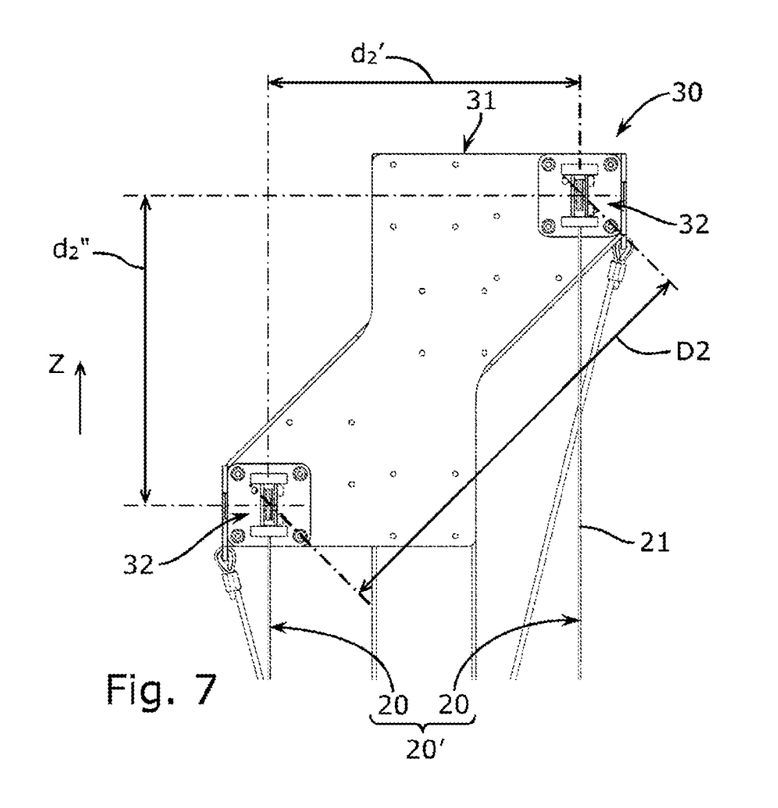
FIG. 7: a front view of a suspension structure of the cable-driven parallel robot according to this embodiment.
Figure 9:
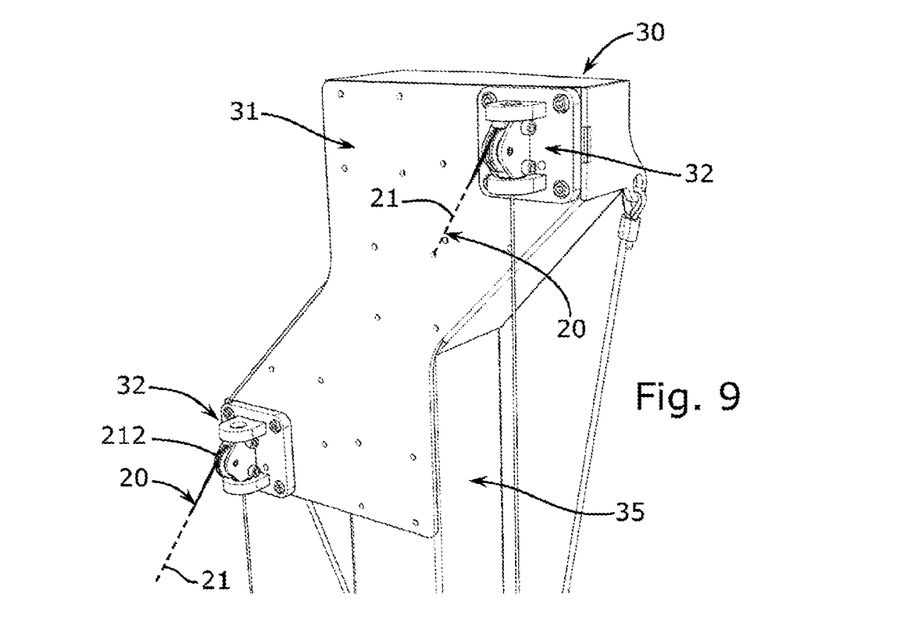
FIG. 9: an isometric view of the suspension structure according to this embodiment.

A suspension structure 31 is positioned at an upper end of each of these masts 35, that is to say also in the vicinity of an upper end of the upper portion 35B of the mast 35. The movable platform 10 of the cable-driven parallel robot 1 is suspended by cables 20, each of the cables 20 having a cable strand 21 tensioned between a first strand 21 end 211 connected to the movable platform 10, and a second strand 21 end 212 connected to a fixed structure 30 in space, in particular in this configuration, at the suspension structure 31. The suspension structures 31 are each configured to include a connection 32 to each of the second ends 212 of the strands 21 of cables 20 of a given pair 20' of cables 20. In the figures, each of these connections 32 is provided by a cable return member 20 for each of the cables 20 of the given cable 20 pair 20', the second end 212 of each cable 20 strand 21 of the given cable 20 pair 20' being configured to be tensioned on the associated return member, between the associated cable strand 21 and the associated winding assembly 40.

The cable-driven parallel robot 1 further comprises winding assemblies 40, each winding assembly 40 being connected to at least one associated cable 20 among the cables 20 to perform winding or unwinding of the associated cable 20. In particular, each winding assembly 40 is connected here only to an associated pair 20' of cables 20 among the cables 20 and configured to synchronously wind and unwind the associated pair 20' of cables 20. Due to the fact that each winding assembly 40 is connected to a pair 20' of associated cables among the cables 20 and configured to wind the pair 20' of associated cables synchronously, this results in a configuration wherein each cable 20 is doubled to form a pair 20' of cables. In such a configuration, the cables of the same pair 20' are wound, or unwound depending on the operating sequence, synchronously by a single winding assembly 40. Such a configuration provides maximum stability of the platform 10 when a cable breaks 20. In the embodiment shown in the figures, the number of pairs 20' of cables 20 is equal to 4.

The winding assemblies 40 are each located close to the ground S on which the fixed structure 30 rests. In particular, each winding assembly 40 is fixed to one of the bases 37. Such a configuration facilitates maintenance by an operator who can work directly on the winding assemblies 40 without having to rise vertically, thus avoiding the use of a cherry picker, for example. This configuration also improves the stability of the mast 35, since the mass of the winding assembly 40, together with the associated ballast 39, helps to stabilize the associated base 37 on the ground S.

Figure 10:
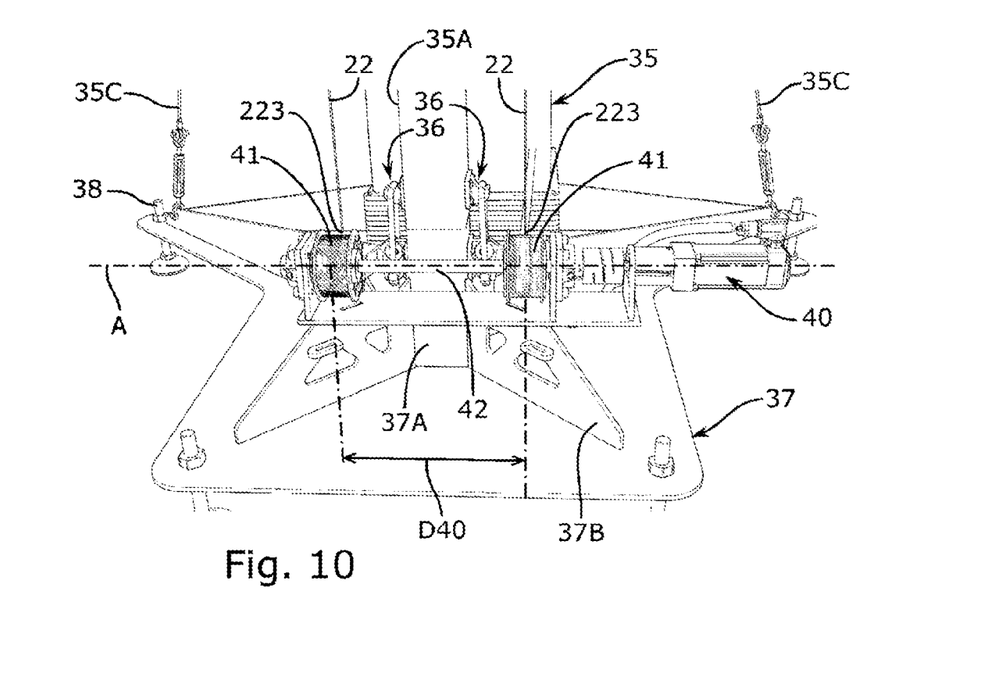
FIG. 10: a view of a winding assembly of the cable-driven parallel robot according to this embodiment.

Each winding assembly 40 comprises two drums 41 rotatable around a single shaft 42. Each of the drums 41 is attached to one of the two cables 20 among the cables 20 of a single pair 20' of associated cables 20.

Each winding assembly 40 comprises at least one motor to rotate the shaft 42, the motor preferably being associated with a gearbox, to form an assembly commonly referred to as a geared motor. In other words, each of the motors rotating two associated drums 41 has a gearbox for modifying the speed ratio and/or torque, in order to rotate the associated winding drums 41 with less effort.

The winding assemblies 40 can include, associated with each of the drums 41, a guide finger for guiding a portion of the associated cable 20 intended to pass between the guide finger and the associated drum 41. Such a guide finger facilitates winding of the associated cable 20 around the drum 41.

The drums 41 can have a smooth winding surface, that is to say without a guide groove. In addition to the fact that the drums 41 are positioned at a certain distance from the suspension platform 10, this allows the cables 20 to wind naturally along the entire length of the drum 41. A spring-loaded system ensures that the associated cable 20 is correctly positioned on the drum 41, limiting the formation of local excess thicknesses due to incorrect winding, and thus achieving an even winding.

The drums 41 are configured to ensure that the associated cable 20 is wound in several thicknesses, enabling the cable-driven parallel robot 1 to travel long distances without having to increase the size of the drums 41 considerably. This constraint is more important if the winding assembly 40 were to be carried by the platform 10 itself.

Each cable 20 extends between the movable platform 10, where it is connected to an anchoring point of the associated cable 20, and the fixed structure 30, where it is connected to the associated winding assembly 40, a portion of which is wound onto the corresponding drum. A return member formed by a return pulley integral with the associated suspension structure 31 enables an angle deflection between, on the one hand, the portion of cable located between the winding assembly 40 and the connection 32 and, on the other hand, the connection 32 and the movable platform 10.

In particular, each of the cables 20 has a cable strand 21 configured to be tensioned between
- the first end 211 of the associated cable strand 21 connected to the movable platform 10; and
- the second strand 21 end 212 connected to the structure 30 fixed in space, in particular in this configuration, at suspension structure 31 via the connection 32.

In addition, each of the cables 20 has a secondary cable strand 22 configured to be tensioned between
- substantially, the second end 212 of the suspension strand 21 of the associated cable 20; and
- a third end 223 of the secondary strand 22 connected to the structure 30 fixed in space, in particular in this configuration, at the associated winding assembly 40;

The first end 211 of each cable 20 strand 21 is attached directly to the platform 10 at an anchoring point 11, while the second end 212 of each cable 20 strand 21 is configured to be tensioned on a return member, between the associated cable 20 strand 21 and the associated winding assembly 40.

The third end 223 of each secondary strand 22 is configured to be tensioned on one of the drums of the associated winding assembly 40, while the end of the secondary strand 22 opposite the corresponding third end 223 is configured to be tensioned on the return member connected to the suspension structure 31, between the secondary cable 20 strand 22 and the associated cable 20 strand 21.

The winding assembly 40 is located generally in line with the suspension structure 31 for each of the masts 35. In particular, each of the drums 41 of a given winding assembly 40 is located in line with one of the two means 32 for connecting one of the return members to the corresponding suspension structure 31 for a given pair 20' of cables 20. In such a configuration, the secondary strands extend generally vertically between the winding assembly 40 and the suspension structure 31 of the mast 35.

Figure 5A:
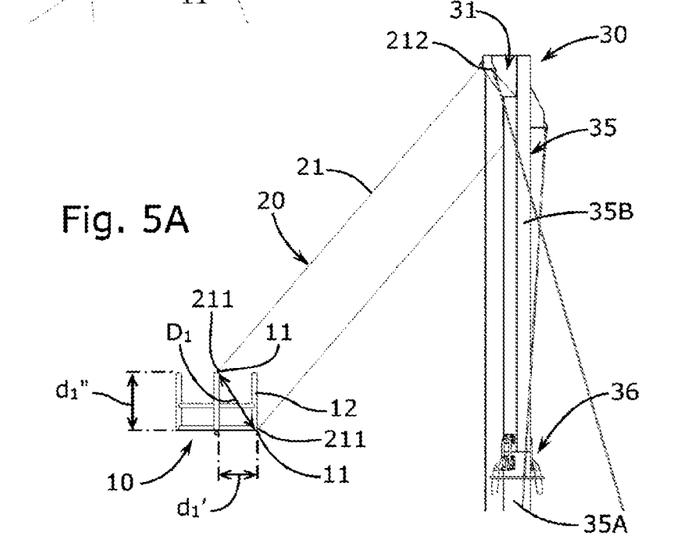
FIG. 5A: a side perspective view of FIG. 2.
Figure 5B:
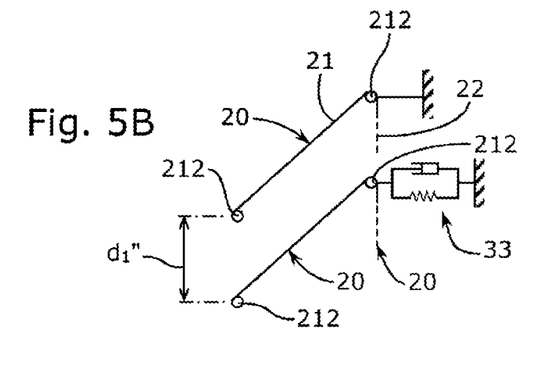
FIG. 5B: a schematic diagram of FIG. 5A.
Figure 6:
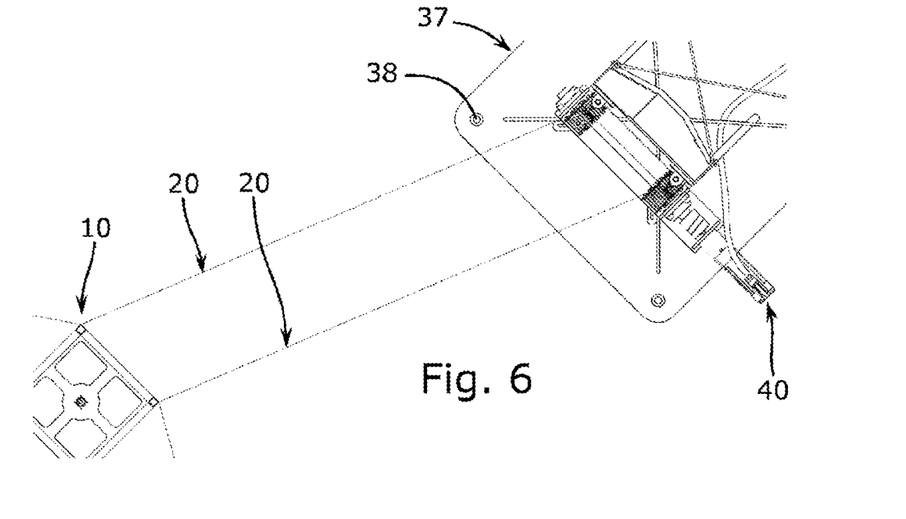
FIG. 6: a top view of FIG. 2.

Preferably, as shown in the diagram in FIG. 5B, at least one of the second ends 212 of the cable 20 strands 21 of a given pair 20' of cables 20 is connected to the fixed structure 30, in particular to the suspension structure 31, by at least one damping mechanism 33. Of course, the cable-driven parallel robot can be configured so that each of the second ends 212 of the cable 20 strands 21 of the given pair 20' of cables 20 is connected to the fixed structure 30, in particular to the suspension structure 31, by at least one damping mechanism 33. In other words, each of the connections 32 between one of the second ends 212 of one of the cable 20 strands 21 and one of the suspension structures 31 is preferably equipped with at least one damping mechanism 33. Its aim is to minimize the shock to the system as a whole that could result from a cable 20 breaking.

When the movable platform 10 is in a reference orientation with respect to the vertical Z, the first ends 211 of the cable 20 strands 21 of the same pair 20' of cables 20 are vertically offset d1" from each other and horizontally offset d1' from each other (see FIGS. 5A and 5B). Offset refers to the fact that the associated ends are distant from each other, the vertical offset corresponding to a non-zero distance separating projections of these ends on a vertical axis, and the horizontal offset corresponding to a non-zero distance separating vertical projections of these ends on a horizontal plane.

Similarly, in a suspended position of the movable platform 10 where the movable platform 10 is in a reference orientation with respect to the vertical Z, the second ends of the cable 20 strands 21 of the given cable 20 pair 20' are vertically offset d2" from each other and horizontally offset d2' from each other (see FIG. 7).

This counteracts moments about the X, Y and Z axes exerted on platform 10 and limits parasitic rotation.

Preferably, a configuration will be chosen wherein, in the suspended position of the movable platform 10, the cable 20 strands 21 of a given pair 20' of cables 20 are parallel.

Such a configuration is achieved, for example, by configuring the cable-driven parallel robot 1 and the installation 100 in such a way that the distance D2 between the connections 32 of the second ends 212 of the cable 20 strands 21 of a given pair 20' of cables 20 are spaced apart by a distance D2 equal to the distance D1 separating the first ends of the cable 20 strands 21 of the associated pair 20' of cables 20. In addition, the cable-driven parallel robot 1 and the system 100 are also configured so that:
- the vertical offset d2" of the second ends 212 of the cable 20 strands 21 of a given pair 20' of cables 20 is equal to the vertical offset d1" of the first ends of the cable 20 strands 21 of the associated pair 20' of cables 20; and
- the horizontal offset d2' of the second ends 212 of the cable 20 strands 21 of a given pair 20' of cables 20 is equal to the horizontal offset d1' of the first ends of the cable 20 strands 21 of the associated pair 20' of cables 20.

In such an embodiment, the two parallel cable 20 strands 21 of the same pair 20' are not aligned along the vertical axis Z. Whatever the end i considered, given that the cable 20 strands 21 of the same pair 20' are parallel, the transverse distance di' between the cables is equal to the vertical distance di" of the ends of the two cable strands 21, where the square root of the sum of the squares of di' and di" is equal to Di. In this configuration, the projection of a pair 20' of parallel cable 20 strands 21 onto planes XZ and XY, or YZ and XY depending on which pair 20' is being considered, forms a parallelogram that always has the same dimensions on one of the two planes relative to the other. This counteracts moments about the X, Y and Z axes exerted on the platform and limits parasitic rotation.

In another, non-shown embodiment, the transverse distance di' may be greater than the vertical distance di", the sum of their squares always being equal to the square of Di; in this embodiment, moments about the vertical axis Z will be countered more effectively.

In another, non-illustrated embodiment, the transverse distance di' is less than the vertical distance d", the sum of their squares always being equal to the square of Di; in this embodiment, moments about the X and Y axes will be countered more effectively.

A vertical offset di" equal to the horizontal offset di' of the first ends 211 and second ends 212 of the cable 20 strands 21 of a given cable 20 pair 20' is therefore a good alternative for counteracting moments about the three axes in space.

To ensure good stability of the platform 10 during its movements, the first ends 211 of the cable 20 strands 21 of a pair 20' of given cables 20 are arranged on the platform 10 at the ends of a diagonal of a side face of the parallelepiped shape of the suspension frame 12. As shown in the figures, this results in a configuration of a cable-driven parallel robot 1 equipped with eight cables 20 divided into four pairs 20' of cables 20, whose strands 21 of each corresponding pair 20' of cables 20 form a parallelogram whose angles are defined by their first and second ends 212, 212, each of the parallelograms being arranged "diagonally". In this embodiment, this offset is equal in both the horizontal and vertical directions, with strands 21 of each pair 20' of cables 20 being parallel, so that each parallelogram thus formed is inclined by 45°. The two connections 32, formed here by the return pulleys, are integral with the corresponding suspension structure 31 for a given pair 20' of cables 20 by being aligned along a straight line inclined at 45° to the horizontal plane.

To improve the performance of the cable-driven parallel robot 1, the installation is configured so that the strands 22 of secondary cables 20 of a given pair 20' of cables 20 are substantially parallel. In such a configuration, the two drums 41 are preferably spaced apart by an average distance D40 substantially equal to the distance D2 separating the connections 32 of the second ends 212 of the cable 20 strands 21 of the associated pair 20' of cables 20, also corresponding to the distance separating the two corresponding return members, the average distance D40 also being equal to the distance D1 separating the first ends 211 of the cable 20 strands 21 of the associated pair 20' of cables 20.

It should be noted that the position of the third ends 223 of the secondary strands 22 connected to the fixed structure 30, in particular to the associated drum 41, and configured to be tensioned on this drum 41, is made to vary substantially around a mean position. Each of the drums 41 has lateral flanges delimiting on either side axially along a winding axis A and a generally cylindrical winding portion of predetermined length interposed between the two lateral flanges (see FIG. 8 and FIG. 10). This variation is due to the winding of the cable 20 as it moves along the winding portion of the associated drum 41 between two extreme positions delimited by the flanges. The average distance D40 measured between the two drums 41 of the same winding assembly 40 is taken between the centers of each of the two drums, that is to say at an average position taken between the two flanges and central to its axis of rotation.

An average distance D40, measured between the two drums 41 of the same winding assembly 40 equal to the distance D2 separating the connections 32 from the second ends 212 of the cable 20 strands 21 of the associated pair 20' of cables 20, facilitates the passage of the associated cable 20 through the return pulley 32. For this reason, the drums 41 can be moved along the motor transmission axis A to fine-tune the position of the drums 41 and allow fine adjustment of the average distance D40 and their position substantially in line with the corresponding connection 32.

In this case, the values of D1, D2, d1', d2', d1" and d2" should preferably be chosen so that:

the vertical offset d2" of the second ends 212 of the cable 20 strands 21 of a given cable 20 pair 20' and the vertical offset d1" of the first ends of the cable 20 strands 21 of the associated cable 20 pair 20' vary from one another by a value less than or equal to 10%; and/or the horizontal offset d2' of the second ends 212 of the cable 20 strands 21 of a given cable 20 pair 20' and the horizontal offset d1' of the first ends of the cable 20 strands 21 of the associated cable 20 pair 20' vary from one another by a value less than or equal to 10%; and/or the distance D1 between the first ends of the strands 21 of cables 20 of a given pair 20' of cables 20 and the distance D2 between the connections 32 of the second ends 212 of the cable 20 strands 21 of the associated pair 20' of cables 20 vary from one another by a value less than or equal to 10%;

Furthermore, the cable-driven parallel robot 1 comprises a control assembly (not shown) for controlling the winding assemblies 40 of the movable platform 10 and controlling the movement of the movable platform 10 in an operational mode.

In order to protect the inspected part 200, the environment, or people in the vicinity, it is imperative to ensure that, when a cable 20 breaks, the platform 10 does not move uncontrollably, or even at all, or to prevent the movements generated by the break from causing the devices embedded in the movable platform 10 to approach elements located in the environment, in particular the part 200 being inspected.

To address this issue, the cable-driven parallel robot 1 comprises means for detecting breakage of the cables 20, connected to the control means. The control means are configured to control the winding assemblies 40 in a degraded mode different from the operational mode when the detecting means detect that at least one of the cables 20 has broken.

One possible embodiment of the detection means is to configure the cables 20 so that they are electrically conductive, the cables 20 each comprising at least one conductive component, in particular a metal component, which extends in a longitudinal direction of the cable 20, for example a metal coating and/or at least one metal wire in a structure of the cable 20. The detection means are electrically connected to the conductive component, and in this case preferably comprise at least one electrical circuit 50 designed to carry a current, for example a direct current, an alternating current, or a current pulse, in the metal component of each cable 20. An example of such an electrical circuit 50 is shown in FIG. 11.

Figure 11:
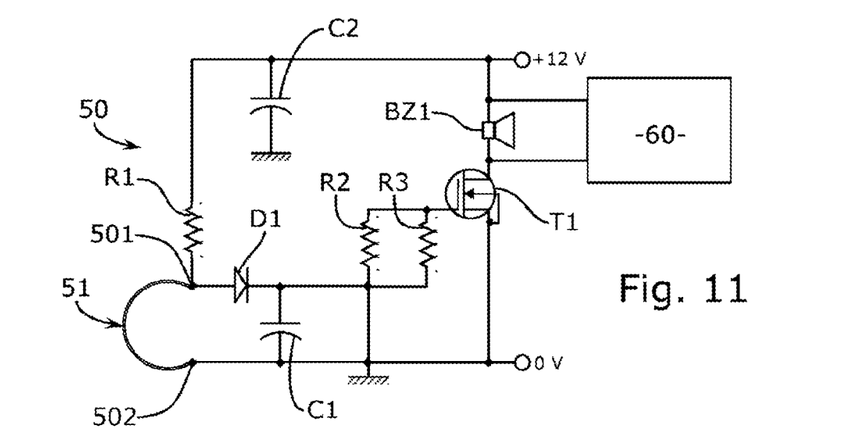
FIG. 11: a diagram of an electrical circuit of a means for detecting a cable break in order to circulate a direct current in a given cable.

As shown in this FIG. 11, the conductive component of each of the cables 20 has a first end 501 connected to the sensing means and a second end 502 connected to the sensing means, and forms a conductive loop 51 between the first end 501 and the second end 502, the conductive loop 51 extending in the longitudinal direction of the cable 20.

The electrical circuit 50 for detecting that a cable 20 has broken, based on a loop sensor, is described here. The conductive loop 51 of the detection means consists of a length of thin enameled copper wire, which connects two input points 501, 502 of the electrical circuit 50, the length of the wire being adapted to the length of the cables 20.

When the conductive loop 51 is open, the electrical circuit 50 triggers at least one electrical/electronic signal. In particular here, the electrical circuit 50 triggers both an active electric/electronic horn BZ1 to produce an audio warning signal and a signal transmitted to control means 60. The audio signal warns any operator in the inspection area of the part 200 being inspected. The electrical circuit 50 is powered by a 12-volt DC supply.

When the conductive loop 51 is closed, the anode of diode D1 is grounded and the transistor T1 is blocked. When the conductive loop opens, the capacitor C1 is rapidly charged via the resistor R1 and diode D1, causing the mosfet transistor T1 to turn on, so that the alarm BZ1 is activated and the control means 60 detect the break in the cable 20. When the conductive loop 51 is closed, the initial condition is maintained by grounding the anode of D1, which stops the charging of C1. However, C1 is discharged quite slowly via the resistor R2, so that T1 is not blocked immediately. This ensures that the alarm remains active and then switches off slowly. This delay can be modified by varying the value of R1, R2 and C1. Optionally, the audible signal can also be stopped by a stop button (not shown) operated by an operator located in the inspection area. The transistor T1 can be any n-channel power mosfet able to control the selected siren.

When a break is detected by the detection means, the information is transmitted to the control means in order to control the winding assemblies 40 in a degraded mode. Control of the winding assemblies 40 varies according to several parameters, such as the known position data of the part 200 during inspection, either theoretical, for example from a model of the part pre-recorded in a memory of the control means, or practical, as a function of one or more sensors, and/or the position of the movable platform 10 before the cable 20 broke, for example by means of position sensors on board the platform 10 or external to the platform 10; and/or a behavior of the movable platform 10 before the breakage of the cable 20, for example an evolution of different positions of the platform during a predetermined period, for example a few seconds, in order to estimate a future position of the movable platform 10 after the breakage of the cable 20; and/or a datum identifying the broken cable(s) among the various cables 20 equipping the cable-driven parallel robot 1.

In this way, the control means are operational to, in degraded mode, control the winding assemblies 40 by taking these parameters into account, in order to move the platform in a maneuver to avoid the inspected part 200 so that the platform moves, despite the detected breakage of the cable 20, along a trajectory to avoid said part 200. Such maneuvers are described below with particular reference to FIGS. 14 and 15.

Figure 12:
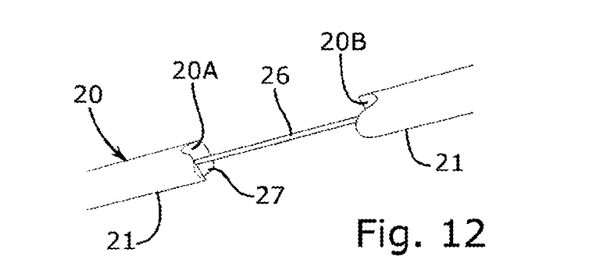
FIG. 12: a view of a broken cable in a configuration wherein the cable comprises an elastic core connecting the two joint ends of the broken portion of the cable.

As shown in FIG. 12, cables 20 may include an elastic core 26 to hold together two joint ends 20A, 20B of an at least partially broken portion of cable 20. This solution limits the risks involved in breaking cables 20, as the elastic core 26 has no particular tensile strength properties, but simply keeps the two joint ends 20A, 20B of the broken cable 20 connected, but in a relaxed manner, after the portion of cable 20 has broken. Such a solution is particularly easy to implement and provides additional safety, avoiding the risk of one of the two joint ends 20A, 20B of the broken cable 20 falling down under its own weight due to gravity, and potentially striking the inspected part 200 which may be located underneath.

The elastic core 26 is surrounded by an outer sheath 27, which may be made of strands, for example. Such strands are generally composed of an assembly of textile or metal wires helically wound around a longitudinal axis of the cable 20. The strands, or at least two of the strand wires, are metallic to form the conductive loop 51. Alternatively or additionally, in the structure of the cable 20, one of the strands can be substituted with an elastic element, such as an elastic wire or cord, configured to hold together two joint ends 20A, 20B of an at least partially broken portion of cable 20, without this being the core 26 of the cable 20.

Figure 13:
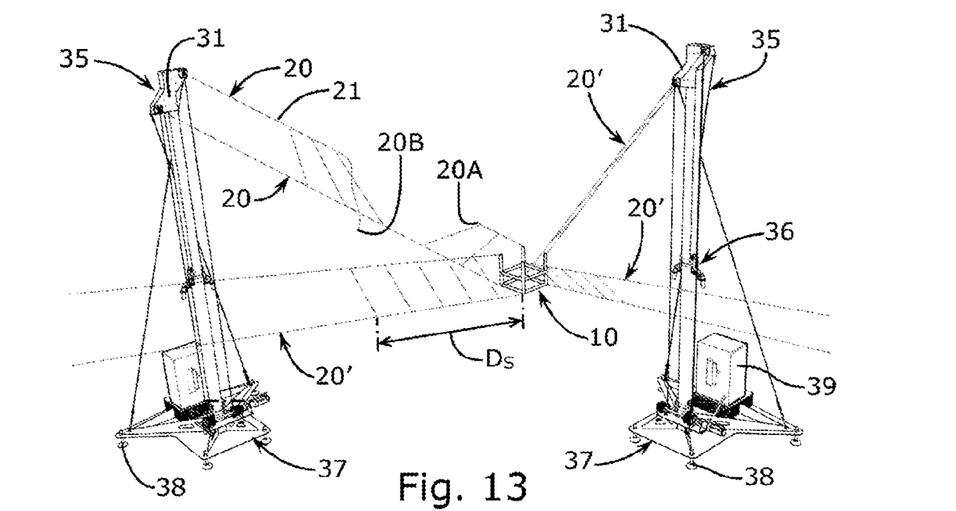
FIG. 13: a view of an comprising a cable-driven parallel robot according to another embodiment of the invention.

FIG. 13 shows a view of an installation 100 with a cable-driven parallel robot 1 according to another embodiment of the invention. This embodiment differs essentially from the embodiment shown in the preceding views in that the cables 20 of each pair 20' of cables 20 are connected to each other generally transversely to their direction when tensioned, by return cables 25. In particular, each of the cable strands 21 of the same cable 20 pair 20' are connected to each other by the return cables 25, at least on a securing portion of the given cable strands 21 of the cable 20 pair 20'. This securing portion extends over a certain distance, called the securing distance Ds, and is preferably located in an area close to the first ends 211 of the cable 20 strands 21 of the associated pair 20' of cables 20.

This securing distance must be strictly less than the length of the cable 20 strands 21, so as to ensure freedom of movement for the movable platform 10. In this way, a maximum distance Ds of the portion provided with return cables 25 is limited by a minimum value of the cables 20 without return cables 25, this minimum value being a limit to the working volume of the parallel cabled robot 1: the smaller this minimum value, the smaller the working volume. The securing distance Ds is the result of a compromise that can be determined on a case-by-case basis so as not to interfere with the working volume of the cable-driven parallel robot 1.

It should be noted that, in this embodiment, the cable 20 strand 21 shown which is severed has two joint ends 20A, 20B which are not held together by an elastic element such as an elastic core 26. In another embodiment, these features can be combined to further limit, or even eliminate the risk of a cable colliding with the part 200 being inspected. The two joint ends 20A, 20B shown in FIG. 13 would then be connected by this elastic element, for example an elastic core 26.

Figure 14:
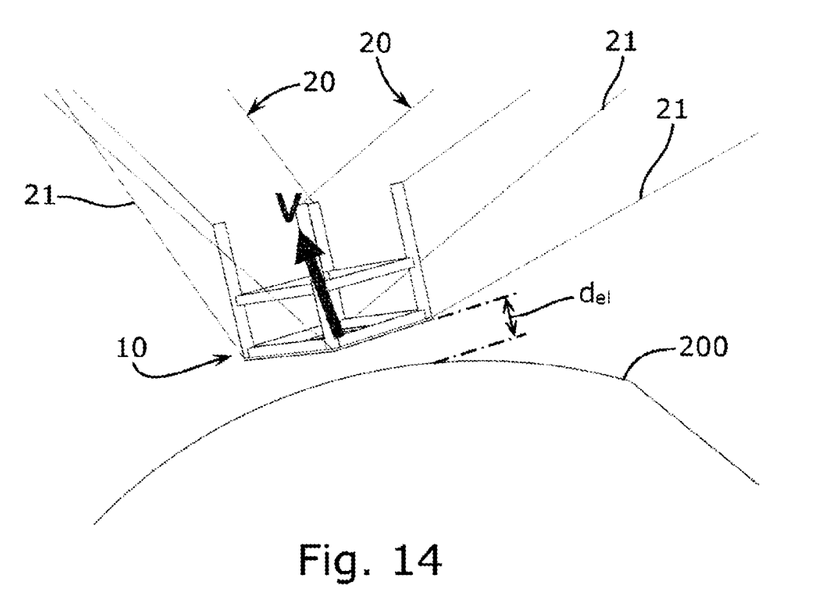
FIG. 14: a view of a platform during inspection of a part and in a position where one of the cables has broken.

FIG. 14 shows a view of a platform 10 during inspection of a part 200 and in a position where one of the cable 20 strands 21 has broken. In particular, FIG. 14 shows a situation during a sequence of implementation of a method for securing the cable-driven parallel robot 1 when a cable 20 has broken. In this way, the detection of a cable break triggers a strategy for moving away from the inspected part 200. The securing method particularly comprises at least the following steps:

a step for detecting the breaking of the cable 20 by means for detecting that a cable 20 has broken; and a step of switching the control assembly from an operational mode to a degraded mode when the detection means detect the break in a cable 20.

The effect of this switching mode is that a degraded mode can be implemented, involving in particular moving the platform 10 along a trajectory away from or avoiding a part 200 to be inspected. Thus, in the degraded mode, the control unit can control the winding assemblies 40 to move the platform 10 in a maneuver to avoid the part 200 being inspected, so that the platform 10 moves, despite the detected breakage of the cable 20, along a deviated trajectory to avoid any risk of collision with the part 200.

According to the shown method, the degraded mode comprises a first step of calculating a distance del, configured to calculate a distance del between the platform 10 and the part 200 being inspected. A second step of calculating is then implemented to calculate a movement of the platform 10 along a trajectory oriented in an opposite direction so as to increase the distance separating the platform from the inspected part 200 relative to the distance del, for example for the calculation of the first movement of the platform 10 along the first trajectory. Then a step of moving the platform 10 is implemented by the control unit to control the winding assemblies 40 so as to move the platform 10 according to the movement calculated in the previous second step of calculating.

The calculated distance del has the form of a vector in which the following information is calculated:
- the norm or modulus, which corresponds to the length of the vector and therefore the numerical value of the distance measurement;
- the direction of the vector which is carried by an axis; and
- the direction of the vector, which determines the orientation of platform 10 relative to the part 200 being inspected.

Once the distance vector del has been calculated, the step of calculating the movement of the platform 10 aims to calculate a trajectory oriented in a direction opposite to the aforementioned vector, so as to increase the modulus of the distance vector del separating the platform from the part 200 being inspected relative to the distance del. To implement the step of moving the platform 10, the control unit operates the winding assemblies 40 so as to move the platform 10 according to the calculated movement by applying a movement initiated by the application of a velocity vector V. This movement, in particular the application of this velocity V, is implemented during a predetermined time interval, necessary to reduce the risk.

Other avoidance sequences are of course possible. For example, the degraded mode may comprise the following steps:
- a step of estimating an inclined position of the platform 10 after the breaking;
- a step of calculating a distance del, configured to calculate a distance between the platform 10 and an inspected part 200 in the estimated inclined position; and
- a step for calculating a movement of the platform 10 along a trajectory oriented in an opposite direction so as to increase the distance del separating the platform 10 from the part 200 being inspected with respect to the distance This sequence differs essentially from the avoidance maneuver described above in that an estimated final inclined position of the platform, depending on the broken cable, is taken into account.

The control unit then drives the winding assemblies 40 to move the platform 10 according to the calculated movement by applying a movement initiated by the application of a velocity vector V.

Figure 15:
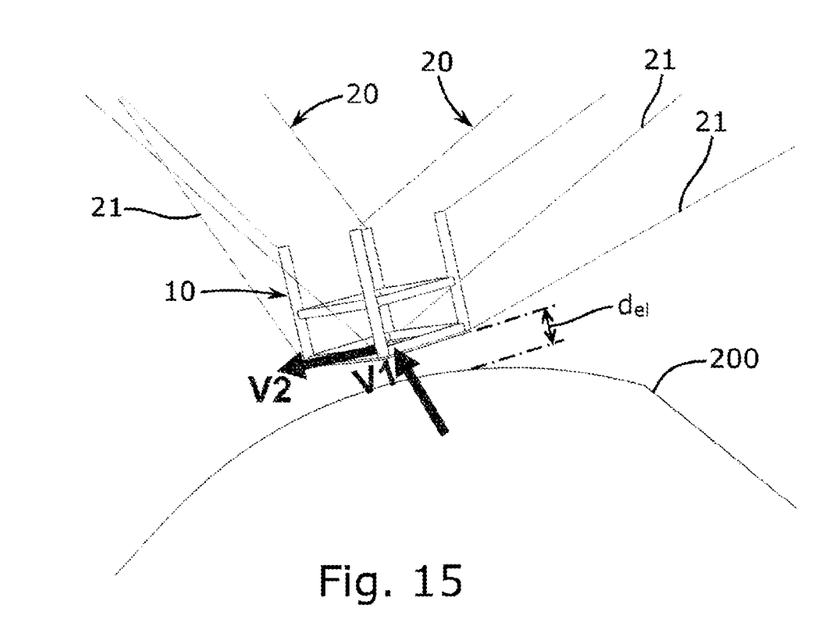
FIG. 15: a view of a platform during inspection of a part and in a position where one of the cables has broken.

FIG. 15 shows a view of a platform 10 during inspection of a part 200 and in a position where one of the cable 20 strands 21 has broken. In particular, FIG. 14 shows a situation during a sequence of implementation of another method for securing the cable-driven parallel robot 1 when a cable 20 has broken. According to this method the degraded mode comprises:
- a step of calculating a first movement of the platform along a first trajectory configured to move the platform 10 away from the inspected part 200;
- a step of calculating a second movement of the platform along a second trajectory designed to return the platform 10 to a previous position detected by detection means, before breaking.

The step of moving the platform 10 includes a step of applying to the platform 10 a movement along an average trajectory of distance or avoidance corresponding to the weighted sum of the first and second trajectories.

The first movement is shown on this FIG. 15 by a velocity vector V1 of a certain modulus, in a certain direction and in a certain orientation. The second movement is also shown on this FIG. 15 by a velocity vector V2. The movements calculated here are the speeds applied to platform 10, once the breakage of a cable 20 has been detected and the calculations carried out.

By applying a weighted sum of these two movements V1, V2 to move the platform 10, the resultant movement reduces the travel of the platform 10 and thus the oscillations, while moving the platform 10 further away from the part 200 being inspected.

In the event that the distance to the environment is not known or cannot be calculated, that is to say the step of calculating a first movement of the platform 10 along a first trajectory to move the platform 10 away from the part 200 to be inspected cannot be finalized, only the step of calculating a second movement V2 of the platform 10 can be implemented. In this case, the movement V2 is used to return the platform 10 to approximately its pre-breakage position.

Note that the step of calculating a first movement of the platform along a first trajectory configured to move the platform 10 away from the part 200 to be inspected can be implemented by the degraded modes as described with reference to FIG. 14. The same calculation steps can be implemented.

The described innovation therefore meets both the objective of greatly reducing (not canceling out) the oscillations of platform 10 (in order to stabilize it as much as possible during the inspection process), and a safety objective, since, in the event that a cable 20 breaks, the presence of the second cable in the parallelogram formed for a given pair 20' of cables 20 and connected to the same winding assembly 40 and the integrity of three other parallelograms formed by the other pairs 20' of cables 20 among the pairs 20' of cables 20 of the cable-driven parallel robot 1 prevent any movement (translation/rotation).

Furthermore, the control means can actively participate in detecting any cable breakage 20 and implement a suitable securing method to further improve safety.

Of course, the invention is described in the foregoing by way of example. It is understood that the person skilled in the art is able to produce different variant embodiments of the invention without departing from the scope of the invention.

In particular, the description focuses on describing the characteristics for a given pair of cables. Of course, an advantageous configuration is that the configurations of the first and second ends, such as their vertical and horizontal offsets, are similar for each of the pairs of cables.

It is emphasized that all of the features, as they are taught to the person skilled in the art from the present disclosure, drawings and attached claims, even though specifically they have been described in relation to other determined features, both individually and in any combinations, may be combined with other features or feature groups disclosed herein, as long as not expressly excluded and no technical circumstances make such combinations impossible or nonsensical.

The invention claimed is:

1. An installation comprising:
a cable-driven parallel robot comprising:
a movable platform configured to be suspended by cables, each of the cables having a cable strand configured to be tensioned between a first strand end connected to the movable platform, and a second strand end connected to a structure fixed in space;
winding assemblies, each winding assembly being connected to a pair of associated cables among the cables and configured to synchronously wind the pair of associated cables, wherein each winding assembly comprises two drums, each of the two drums being secured to one of the cables among the cables of an associated pair of cables and being configured to wind the associated cable, each winding assembly being driven by a single motor configured to drive a common rotation shaft carrying the two drums of a given pair of cables; and
a fixed structure from which the platform is suspended, the fixed structure comprises a plurality of suspension structures, each of the suspension structures being configured to comprise a connection with each of the second ends of the cable strands of a given pair of cables;
the installation configured such that when the movable platform is in a reference orientation relative to a vertical direction, the first ends of the cable strands of a same pair of cables are offset vertically from each other and are offset horizontally from each other, and such that the distance between the connections of the second ends of the cable strands of a given pair of cables are separated from each other by a distance equal to the distance separating the first strand ends of the cables from the pair of associated cables such that in a suspended position of the movable platform, the cable strands of a given pair of cables are parallel.

2. The installation according to claim 1, wherein the first end of each cable strand is attached to the platform at an anchoring point.

3. The installation according to claim 1, wherein the second end of each cable strand is configured to be tensioned on a return member between an associated cable strand and the associated winding assembly.

4. The installation according to claim 1, wherein the vertical offset and the horizontal offset of the first ends of the cable strands of a pair of given cables are equal.

5. The installation according to claim 1, wherein the platform has a suspension frame having a shape that is parallelepiped.

6. The installation according to claim 5, wherein the first ends of the cable strands of a pair of given cables are arranged on the platform at the ends of a diagonal of a lateral face of the suspension frame.

7. The installation according to claim 1, the two drums of a same winding assembly are separated from each other by an average distance substantially equal to a distance separating the first ends of the cable strands of the associated pair of cables.

8. The installation according to claim 1, wherein a number of pairs of cables is greater than or equal to three.

9. The installation according to claim 1, wherein each of the connections comprises a cable return member for each of the cables of the given pair of cables, the second end of each cable strand of the given pair of cables being configured to be tensioned on an associated return member, between an associated cable strand and the associated winding assembly.

10. The installation according to claim 9, wherein in a suspended position of the movable platform, each cable of the cable-driven parallel robot comprises a secondary cable strand configured to be tensioned between the second end of the strand of the associated cable and a third end of the secondary strand connected to the structure fixed in space, the strands of secondary cables of a given pair of cables being substantially parallel.

11. The installation according to claim 10, wherein the strands of secondary cables of a given pair of cables are substantially parallel and the two drums of each winding assembly are located plumb with the corresponding connection, the two drums of a same winding assembly being distant from each other by an average distance substantially equal to a horizontal offset of the second ends of the strands of cables of the associated pair of cables.

12. The installation according to claim 1, wherein in a suspended position of the movable platform, the second ends of the strands of cables of a given pair of cables are offset vertically from each other and are shifted horizontally from each other, the vertical offset and the horizontal offset of the second strand ends of the cables of the given pair of cables being equal.

13. The installation according to claim 1, wherein at least one of the second ends of the strands of cables of a given pair of cables is connected to the fixed structure by at least one damping mechanism.

14. The installation according to claim 1, wherein the winding assemblies are each located in a vicinity of a floor on which the fixed structure rests.

15. The installation according to claim 1, wherein the fixed structure comprises removable masts configured to be vertically upright in a deployed position, and configured to each support at least one suspension structure.

* * * * *